United States Patent Office 3,386,410
Patented June 4, 1968

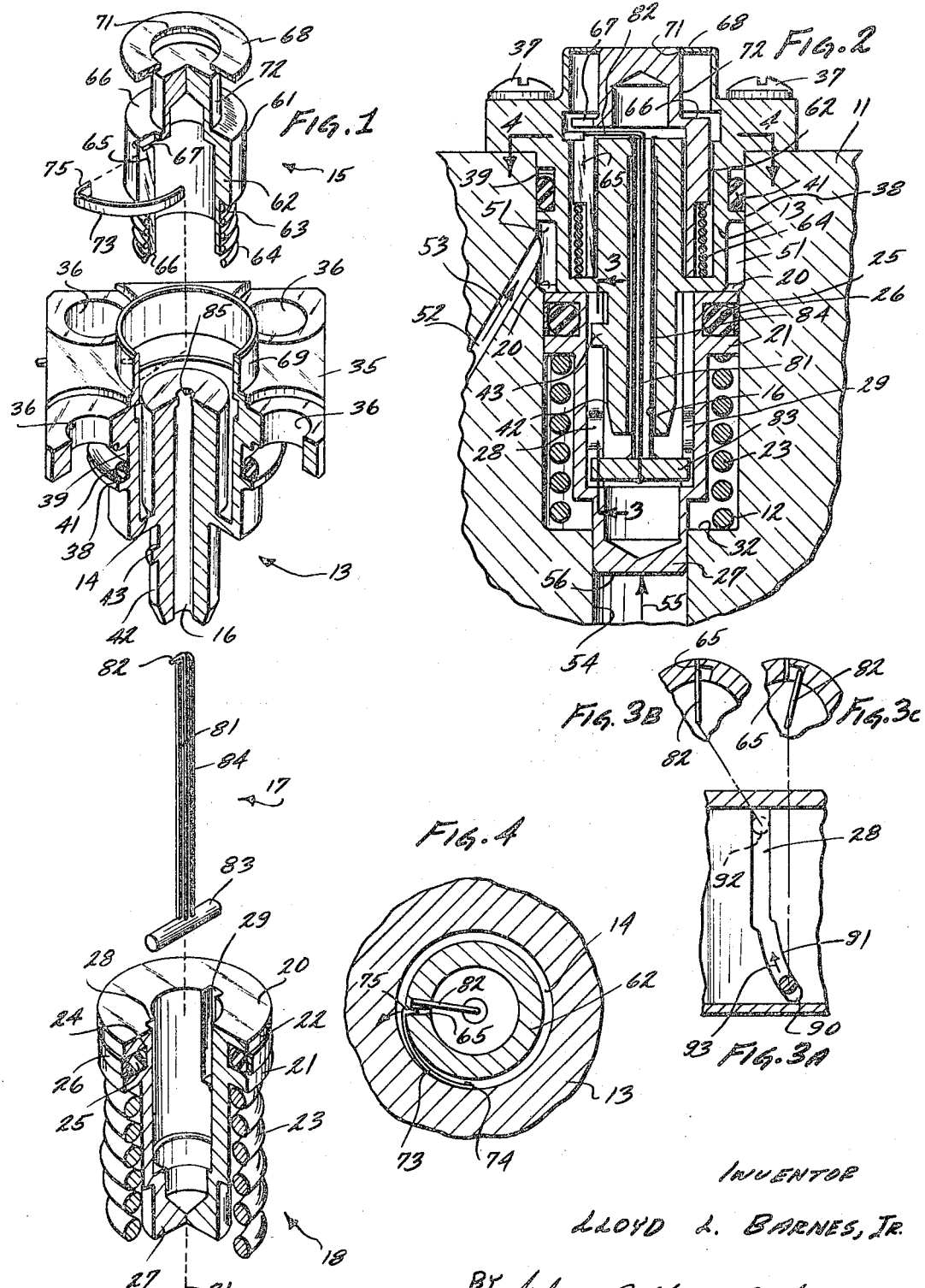

3,386,410
FLUID PRESSURE INDICATOR APPARATUS
Lloyd L. Barnes, Jr., Burbank, Calif., assignor to Bell
Aerospace Corporation, a corporation of Delaware
Filed Mar. 14, 1966, Ser. No. 533,921
10 Claims. (Cl. 116—70)

ABSTRACT OF THE DISCLOSURE

Disclosed is a hydraeric pressure indicator apparatus which includes a piston movable in response to the application of a predetermined pressure thereto. As the piston moves, a latching means is actuated through a torsion rod in such a manner as to release the indicator so that it can move and thereby provide a signal that the predetermined amount of pressure is present.

This invention relates generally to indicating apparatus and more particularly to such apparatus which is responsive to forces generated by hydraeric fluid to produce an output signal indicative thereof. More specifically, the present invention is adapted to detect when the pressure differential between two source of hydraeric fluid, such as the input and output of a hydraeric fluid filter, exceeds a predetermined amount and to automatically provide a signal indicative thereof.

The term "hydraeric" as used throughout this specification and claims is generic to liquids and gases under pressure and is intended to cover generically both hydraulics and pneumatics.

In the prior art it has long been desirable to provide a signal, particularly a visual signal, which is indicative of the existence of excessive pressure at any given point within a particular hydraeric system. Such prior art apparatus to provide these visual signals has for the most part employed a pair of magnets which in their non-actuated condition maintain a pre-set air gap therebetween. Upon the presence of the excessive undesired pressure one of the magnets moves with respect to the other thus enlarging the air gap so that the magnetic strength therebetween is weakened and as a result thereof a biasing spring is permitted to actuate a visual indicating apparatus. As can be seen, such apparatus does not employ any positive locking or latching members but instead relies upon the magnetic force present between the two magnets.

Although such prior art apparatus has operated under certain conditions to provide the desirable indications, various inherent difficulties have been discovered with respect thereto. One such inherent difficulty is that such devices are particularly subject to vibrations and shocks and in the presence thereof, both intermittant and continuous, tend to cause the magnets to part and thus provide false signals indicative of excessive pressure within the system.

An additional inherent problem in existence with respect to the prior art systems is that the spring causing the visual indicator to become actuated is extremely weak and critical insofar as the forces exerted thereby are concerned. Thus it becomes extremely easy to reset the visual indicator once the same has become actuated. Therefore, such resetting can occur inadvertently and when such does occur the visual indication of the existence of excessive pressure can be undesirably lost. Furthermore, foreign contaminants within the system, such as, for example, a dirt particle, can prevent actuation of the visual indicator even though excessive pressure is in existence and the magnets have moved accordingly. Many prior art devices necessitate the utilization of movable seals between system pressure and the exterior of the indicator. The utilization of such movable seals in most instances introduces undesirable hydraeric leaks in the system.

In cold weather, in hydraulic systems, it has been found that the indicators have a tendency to become actuated since the hydraeric fluid of the system is not at the desired operating temperatures and therefore the hydraulic fluid is thicker than normal. Thus the pressure differential which is in existence under these circumstances, even though it is indicative solely of low temperatures, causes the indicator to actuate. Such temperature sensitive actuation is not desirable in many applications.

Accordingly, it is an object of the present invention to provide a hydaeric fluid pressure indicator apparatus which produces an exterior visual signal without system fluid leakage and which is rugged, reliable, and insensitive to adverse operating conditions such as vibration and shock, even when severely administered.

It is another object of the present invention to provide a hydraeric fluid pressure indicator apparatus which becomes operative to provide the desired visual signal only when the hydraeric fluid is above a predetermined minimum operating temperature.

It is a further object of the present invention to provide a hydraeric fluid pressure indicator apparatus which does not rely upon magnetic forces and varying air gaps for operation thereof.

It is still a further object of the present invention to provide a hydraeric fluid pressure indicator apparatus which has no movable seals between system hydraeric pressure and the exterior of the indicator.

It is yet another object of the present invention to provide a hydraeric fluid pressure indicator which employs a positive mechanical lock on the visual indicator and which is operable only by means of excessive fluid pressure beyond the predetermined desirable amount.

It is yet another object of the present invention to provide a hydraeric fluid pressure indicator apparatus which employs substantial biasing forces thus requiring a positive application of more than a nominal force to reset the apparatus thus precluding accidental resetting.

Other and additional objects and advantages of the present invention, both with respect to its organization and mode of operation, will become apparent from a consideration of the following description taken in conjunction with the accompanying drawing which is presented by way of example only and is not inteneded as a limitation upon the scope of the present invention and in which:

FIGURE 1 is an exploded view of a hydraeric fluid pressure indicator apparatus in accordance with the present invention;

FIGURE 2 is a cross-sectional view, in assembled relationship, of a hydraeric fluid pressure indicator apparatus in accordance with the present invention;

FIGURE 3A is a fragmentary sectional view taken about the lines 3—3 of FIGURE 2 of a portion of the apparatus illustrated in FIGURES 1 and 2 illustrating the lacking operation thereof;

FIGURES 3B and 3C are fragmentary, cross-sectional views taken about the lines 4—4 of FIGURE 2 also illustrating the latching operation; and FIGURE 4 is a fragmentary, cross-sectional view taken about the line 4—4 of FIGURES 2 illustrating a temperature sensitive locking portion of the apparatus in accordance with the present invention.

A hydraeric fluid pressure indicator apparatus in accordance with the present invention includes a piston means which is movable in response to the presence of hydraeric fluid in excess of a predetermined amount. An indicator means has coupled thereto a torsion bar means which controls the indicator means in its movement from a first to a second position to thereby develop an output signal. Torque transmitting means is affixed to the torsion bar means and engages the movable piston to rotate the torsion bar means in response to movement of the piston and thereby to actuate the indicator means providing the signal that an excess pressure is present at a point within the system which is being monitored.

Referring now to the drawing and more particularly to FIGURES 1 and 2 thereof, a hydraeric fluid pressure indicator is illustrated in detail. As will be noted from the illustration and from the following description, a fluid pressure indicator in accordance with the present invention has been illustrated and described in specific detail, particularly with respect to an apparatus for detecting differences in pressures applied to the indicator from separate sources thereof, such as the input and output of a filter. It is, however, to be expressly understood that such specific illustration and description is not to be considered as a limitation upon the scope of the present invention as defined in the appended claims.

As is illustrated in the figures, there is provided a housing 11 defining a cavity 12 therein. The housing 11 may be a separate enclosure which receives and forms an integral part of the overall fluid pressure indicator apparatus or, alternatively, may be a portion of a housing for a hydraeric system, whichever may be most desired for any particular design application. Received within the cavity 12 in the housing 11 is a body section or member 13. The body member 13 defines a recess 14 which receives a plunger illustrated generally at 15. The body member 13 also defines a bore 16 extending therethrough which is adapted to receive a torque transmission assembly illustrated generally at 17.

Also seated within the cavity 12 in the housing 11 is a piston assembly illustrated generally at 18. As will become more fully apparent from the following description, the piston assembly 18 moves when forces applied thereto exceed a predetermined amount. Such movement is converted into a torque by the torque transmission assembly 17. The torque is utilized to disengage a latching mechanism from the plunger 15 permitting it to be extended outwardly from the housing so that it is readily visible and thus provides a signal that the predetermined pressure has been reached.

The piston assembly 18 includes a piston 21 having a radial flange 22 at the upper end thereof which operates as a seat for the upper portion of a biasing means such as a spring 23. The flange 22 also defines a recess 24 therein which receives an O-ring 25 and a Teflon slipper ring 26. The Teflon slipper ring 26 prevents the seal on the piston 21 from sticking to the walls of the cavity 12. As can be seen, the piston 21 is hollow but is closed at the lower end 27 thereof. Internally of the hollow piston 21 a pair of opposed slots 28 and 29 are provided. These slots 28 and 29 extend from the upper surface of the piston 21 downwardly for a predetermined distance. At the lower terminus of the slots 28 and 29 there is provided a cam track or surface which is angularly displaced with respect to the axis 31 of the piston 21. This cam track or surface will be more fully explained hereinafter. As is shown more specifically in FIGURE 2, the piston assembly 18 as above described is placed within the cavity 12 in such a manner that the spring 23 seats against the lower surface 32 of the cavity 12 thus providing a given force which operates to continuously urge the piston upwardly as viewed in FIGURE 2.

The body portion 13 includes a mounting flange 35 having a plurality of openings 36 therein which function to receive mounting bolts 37 as shown in FIGURE 2 for affixing the indicating apparatus to the housing 11. Alternatively, of course, it should be recognized that the indicating apparatus may be affixed by means of a threaded outer surface on the body section 13 and a head which may be gripped by an inserting tool to thread the apparatus into the housing 11 if such is desired.

The body portion 13 includes a flange 38 defining a recess 39 therein which receives a sealing O-ring 41 to seal system pressure from the exterior of the housing 11 as is well known in the prior art. The body portion includes a downwardly extending section 52 defining a guide protrusion 43 extending outwardly therefrom. The guide protrusion 43 is received within the slot 28 of the piston 21 and prevents rotation of the piston 21 during movement thereof as will be more fully described hereinbelow.

Upon being inserted into the cavity 12 of the housing 11, the body section 13 occupies the position as illustrated in FIGURE 2 and functions as an upper limit stop means for the piston 21.

As will be seen particularly with respect to FIGURE 2, when the body section 13 is inserted into the cavity 12 and abuts the upper surface of the piston 21, there is provided a chamber 51. The chamber 51 is adapted to receive system pressure through the conduit means 52 which is connected to a first source of pressure, not shown, such as the inlet to a filter as indicated by the arrow 53. The system pressure communicating with the chamber 51 therefore is in contact with the upper surface 20 of the piston 21. As should also be noted the housing 11 defines a bore or port 54 in the lower surface 32 thereof. This port 54 is connected to a second source of hydraeric pressure (not shown) such as the output of a filter. The pressure from this source, as indicated by the arrow 55 is in contact with the lower surface 56 of the piston 21.

The plunger assembly 15 includes a plunger 61 having an outwardly extending radially enlarged section 62 which defines a shoulder 63 which receives the upper portion of a bias means such as a spring 64. The plunger 16 defines a slot 65 extending from the lower edge 66 thereof upwardly as viewed in FIGURE 1 and FIGURE 2. At the upper edge of the slot short of the shoulder surface 66 there is provided an angularly directed opening 67 which receives a latching means as will be described more fully hereinbelow. An annular ring 68 fits within a collar 69 and defines an opening 71 through which the upper portion 72 of the plunger extends to provide a visual signal when the indicator is in its operated position. Traditionally, this upper portion 72 of the plunger 61 is painted red or some other readily discernible vivid color.

A temperature sensitive bi-metallic strip 73 is affixed to the inner surface of the body section 13 by any means known to the art and defines lock means such as an L-shaped blocking tab 75 which registers with the slot 65 provided in the plunger 61. The operation of the bi-metallic member 73 will be more fully described hereinbelow.

A torque transmitting assembly 17 includes a torsion rod 81 which terminates in a trip bar such as a latch finger 82 at one end thereof. The latch finger 82 rides within the slot 65 defined by the plunger 61 and during normal operation fits within the angular opening 67 to maintain the plunger 61 in a non-operated position such as that illustrated in FIGURE 2. A cam follower such as a cross rod 83 is inserted through the slots 28 and 29 of the piston 21 and engages the cam surfaces which produce a torque or twist which is imparted by way of the torsion bar 81 to the latch finger 82. A torque tube 84 is sealed to the cross rod 83 at one end thereof and is inserted into the bore 16 and at the opposite end thereof is sealed to the upper end 85 of the bore 16, as is illustrated particularly in FIGURE 2. It can thus be seen that the torque tube functions as a support means for the torsion rod and also as a seal to preclude system pressure from leaking to the exterior.

Referring now more particularly to FIGURE 3, there is illustrated in more detail the latching operation in accordance with the present invention. As above referred to as the slot 28 reaches its lower terminal end 90 it defines a cam surface 91. (The slot 29 terminates similarly.) One end of the cross-rod 83 is received in the slot 28 as illustrated in dashed lines 92. In this position the latch finger 82 is aligned with the slot 65 and the plunger 61 is unlatched and free to move upwardly as viewed in FIGURE 2 in response to bias from the spring 64. As the cross rod 83 moves downwardly and contacts the cam surface 91 the torsion rod 81 is twisted. When the cross rod is adjacent the lower end 90 of the slot 28 the latch finger 82 registers with the angular opening 67 at the upper end of the slot 65. When the latch finger 82 and opening 67 are in such registration, the latch finger 82 is as illustrated in FIGURE 3C and the plunger 61 is as illustrated in FIGURE 2. It should be recognized and understood that when the cross rod and latch finger are as illustrated in FIGURES 3A and 3C respectively, the torque tube 84 is twisted and under tension while the torsion rod 81 is not.

Assuming for purposes of description that the input pressure in chamber 51 is greater than the output pressure in bore 54 by an amount in excess of the predetermined permissible differential, as set by the force of spring 23, then the piston 21 moves downwardly as viewed in FIGURE 2. This downward movement piston 21 causes the cross-rod 83 to move upwardly in the slots 28–29 as indicated by the arrow 93. As the cross-rod 83 reaches the straight upper portion of the slot 28 (FIGURE 3) the torque tube, now returned to its untwisted position, applies a bias to the torsion rod 81 causing it to move the latch finger 82 to the left as shown in FIGURE 3B, thus unlatching plunger 61 and causing it to become visible above ring 68.

To preclude the above operation occurring when fluid viscosity only causes the pressure differential needed for indicator operation there is included a temperature sensitive member 73 as shown more in detail in FIGURE 4. As therein shown, one end 74 of the bi-metallic member 73 is rigidly affixed to the inner wall of body 13. The opposite end, terminating in the blocking tab 75, registers with the slot 65. During the time the temperature of the hydraeric fluid is below operating temperature the tab 75 precludes latch finger 82 from registering with slot 65 even though piston 21 has moved downwardly. As temperature of the hydraeric fluid increases the bi-metallic strips responds to move the tab 75 in a counter-clockwise direction, as viewed in FIGURE 4, to permit latch finger 82 to register with slot 65.

There has thus been illustrated and described in detail a pressure indicating apparatus adapted to detect an excessive pressure differential and automatically provide a visual signal indicative thereof. It is to be expressly understood that such detailed description and illustration is for purposes of clarity and ease of understanding and is not to be taken as a limitation on the scope of appended claims.

What is claimed is:

1. Hydraeric fluid pressure indicator apparatus comprising:
    piston means movable responsive to a predetermined hydraeric pressure exerted thereon;
    torsion bar means;
    indicator means movable from a first position to a second position to indicate the existence of said predetermined pressure;
    latch means coupled to said torsion bar means holding said indicator means in said first position in the absence of said predetermined pressure;
    and torque transmitting means affixed to said torsion bar means and engaging said piston means to rotate said torsion bar means in response to movement of said piston means, rotation of said torsion bar means moving said latch means to a position such that indicator means moves to said second position.

2. Apparatus as defined in claim 1 in which said movable piston defines a cam surface and said torque transmitting means is a cam follower rigidly affixed to said torsion bar means and in engagement with said cam surface.

3. Apparatus as defined in claim 1 wherein said indicator means includes plunger means movable from said first to said second position and defining an opening therein, said plunger means having maximum visibility in said second position, said latch means engages said opening in said plunger means and retains said plunger means in its first position but does not engage said opening when said plunger means is in its second position, said latch means being rigidly affixed to said torsion bar means.

4. Apparatus as defined in claim 3 which further includes temperature sensitive lock means engaging said plunger means and precluding movement of said latch means to its said second position during the time the temperature of said hydraeric fluid is below a predetermined point.

5. Apparatus as defined in claim 3 which further includes a body member defining a recess therein for receiving said plunger means, said plunger means defining a slot extending inwardly from one terminal edge thereof, and biasing means disposed in said recess and constantly urging said plunger means toward its said second position, and said latch means is a trip bar affixed to said torsion bar means and movable thereby into alignment with said slot to allow said plunger to move to its said second position.

6. Apparatus as defined in claim 5 which further incluсdse a temperature sensitive bi-metallic strip member disposed in said recess and rigidly affixed to said body member, said strip member terminating in a tab portion aligned with said slot and residing therein during the time the temperature of said hydraeric fluid is below a predetermined level to block alignment of said trip bar with said slot during said time.

7. Apparatus as defined in claim 3 which further includes a body member defining a bore therethrough, said torsion bar means being received in said bore, torque tube means received within said bore, surrounding said torsion bar and having one end thereof sealed at one end of said bore, said torque tube means being rigidly affixed to said torque transmitting means at the other end thereof, said latch means being a trip bar affixed to and movable by said torsion bar.

8. Apparatus as defined in claim 7 in which said torque tube means is twisted during the time said trip bar engages said plunger means and maintains said plunger means in its said first position and said torque tube means is moved to a non-twisted neutral position in response to movement of said piston means.

9. Hydraeric fluid pressure indicator apparatus comprising:
    housing means defining a cavity therein;
    a body member rigidly affixed to said housing and disposed within said cavity, said body member defining a centrally disposed bore therethrough;
    piston means axially movably disposed within said cavity about one end of said body member and defining cam surfaces which are angularly displaced with respect to the axis of said piston;
    cam follower means in sliding engagement with said cam surfaces;
    restraining means engaging said piston to prevent rotational movement thereof;
    spring bias means disposed within said cavity and applying force to said piston for urging said piston in a first direction;
    means for applying hydraeric fluid from a first source thereof to said piston for applying force to urge said piston in said first direction;
    means communicating with said cavity for conducting hydraeric fluid from a second source thereof into engagement with said piston and applying force for urging said piston in the opposite direction, whereby when the force in the opposite direction exerted on said piston is greater than the forces in the first direction exerted on said piston, said piston moves in said opposite direction;
    plunger means movably disposed within said cavity about the other end of said body member and biased to move externally of said housing;

latch means engaging said plunger means to prevent movement thereof except when said fluid from said second source exerts said greater force;

a torsion rod disposed within said bore and affixed to said latch means at one end thereof and being rigidly affixed to said cam follower means at the opposite end thereof, thereby to impart a twisting movement to said torsion rod upon movement of said piston means in response to said greater force to disengage said latch means from said plunger means.

10. Apparatus as defined in claim 9 which further includes a torque tube disposed within said bore, surrounding said torsion rod and rigidly affixed in sealing engagement at one end of said body member and at the other in sealing engagement to said cam follower.

References Cited
UNITED STATES PATENTS

| | | | |
|---|---|---|---|
| 2,954,751 | 10/1960 | Barnes | 116—70 |
| 3,154,049 | 10/1964 | Smith et al. | 116—70 |
| 3,247,824 | 4/1966 | Rodgers | 116—70 |

LOUIS R. PRINCE, *Primary Examiner.*

DAVID SCHONBERG, *Examiner.*

DENIS E. CORR, *Assistant Examiner.*